US012270657B2

(12) United States Patent
Singh et al.

(10) Patent No.: US 12,270,657 B2
(45) Date of Patent: Apr. 8, 2025

(54) SCENE INTELLIGENCE FOR COLLABORATIVE SEMANTIC MAPPING WITH MOBILE ROBOTS

(71) Applicant: Intel Corporation, Santa Clara, CA (US)

(72) Inventors: Ruchika Singh, Chandler, AZ (US); Mandar Chincholkar, Portland, OR (US); Hassnaa Moustafa, San Jose, CA (US); Francesc Guim Bernat, Barcelona (ES); Rita Chattopadhyay, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 137 days.

(21) Appl. No.: 17/704,934

(22) Filed: Mar. 25, 2022

(65) Prior Publication Data
US 2022/0214170 A1 Jul. 7, 2022

(51) Int. Cl.
G01C 21/16 (2006.01)
G01C 21/00 (2006.01)
G06N 20/20 (2019.01)

(52) U.S. Cl.
CPC ...... *G01C 21/1656* (2020.08); *G01C 21/3811* (2020.08); *G01C 21/3896* (2020.08); *G06N 20/20* (2019.01)

(58) Field of Classification Search
CPC ............ G01C 21/1656; G01C 21/3811; G01C 21/3896; G01C 21/005; G06N 20/20
USPC ...................................................... 701/1, 408
See application file for complete search history.

(56) References Cited

U.S. PATENT DOCUMENTS

| | | | | |
|---|---|---|---|---|
| 9,371,099 B2* | 6/2016 | Lagassey | ............... | B62D 41/00 |
| 10,628,714 B2* | 4/2020 | Pradeep | .................. | G10L 15/08 |
| 10,846,873 B2* | 11/2020 | Versace | .................... | G01S 7/41 |
| 11,571,813 B2* | 2/2023 | Narayana | ............... | B25J 9/1679 |
| 2002/0165790 A1* | 11/2002 | Bancroft | ............. | G05D 1/0088 |
| | | | | 705/28 |

(Continued)

FOREIGN PATENT DOCUMENTS

WO WO-2022125322 A1 * 6/2022 ........ B60W 50/0205

OTHER PUBLICATIONS

Nigam et al, Social Context Perception for Mobile Robots, 2015, IEEE, IEEE/RSJ International Conference on Intelligent Robots and Systems (IROS) Congress Center Hamburg Sep. 28-Oct. 2, 2015. Hamburg, Germany, pp. 3621-3627 (Year: 2015).*

(Continued)

*Primary Examiner* — Jaime Figueroa
(74) *Attorney, Agent, or Firm* — Schwegman Lundberg & Woessner, P.A.

(57) ABSTRACT

Various aspects of techniques, systems, and use cases include provide instructions for operating an autonomous mobile robot (AMR). A technique may include capturing audio or video data using a sensor of the AMR, performing a classification of the audio or video data using a trained classifier, and identifying a coordinate of an environmental map corresponding to a location of the audio or video data. The technique may include updating the environmental map to include the classification as metadata corresponding to the coordinate. The technique may include communicating the updated environmental map to an edge device.

24 Claims, 7 Drawing Sheets

(56) References Cited

U.S. PATENT DOCUMENTS

| | | | | |
|---|---|---|---|---|
| 2011/0010033 A1* | 1/2011 | Asahara | ............... | G05D 1/024 |
| | | | | 901/1 |
| 2018/0188715 A1* | 7/2018 | Cella | ..................... | H04L 67/10 |
| 2019/0087975 A1* | 3/2019 | Versace | ................. | G06N 3/049 |
| 2020/0404177 A1* | 12/2020 | Sapienza | .................. | G06T 7/11 |
| 2021/0133670 A1* | 5/2021 | Cella | ..................... | G06N 3/044 |
| 2021/0252698 A1* | 8/2021 | Paxton | .................. | G06N 3/045 |
| 2021/0334645 A1* | 10/2021 | Pardeshi | ............... | G06N 3/045 |
| 2022/0036302 A1* | 2/2022 | Cella | ................. | G06Q 10/0835 |
| 2022/0143237 A1* | 5/2022 | Pierson | .............. | G01C 21/343 |
| 2022/0176988 A1* | 6/2022 | Wang | .................. | G06V 10/762 |

OTHER PUBLICATIONS

A. Chau, et al.; "Audio-Visual SLAM towards Human Tracking and Human-Robot Interaction in Indoor Environments," 2019 28th IEEE International Conference on Robot and Human Interactive Communication (ROMAN), New Delhi, India, 2019, pp. 1-8, doi: 10.1109/RO-MAN46459.2019.8956321. (Year: 2019).*

Quan Nguyen, et al. Autonomous Sensorimotor Learning for Sound Source Localization by a Humanoid Robot. IROS 2018-Workshop on Crossmodal Learning for Intelligent Robotics in conjunction with IEEE/RSJ IROS, Oct. 2018, Madrid, Spain. hal-01921882 (Year: 2018).*

* cited by examiner

SCENE INTELLIGENCE FOR COLLABORATIVE SEMANTIC MAPPING WITH MOBILE ROBOTS

BACKGROUND

Robots and other autonomous agents may be programmed to complete complex real-world tasks. Robotics use artificial intelligence (AI) to perform tasks in industrial environments. Robotics span a wide range of industrial applications, such as smart manufacturing assembly lines, multi-robot automotive component assembly, computer and consumer electronics fabrication, smart retail and warehouse logistics, robotic datacenters, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
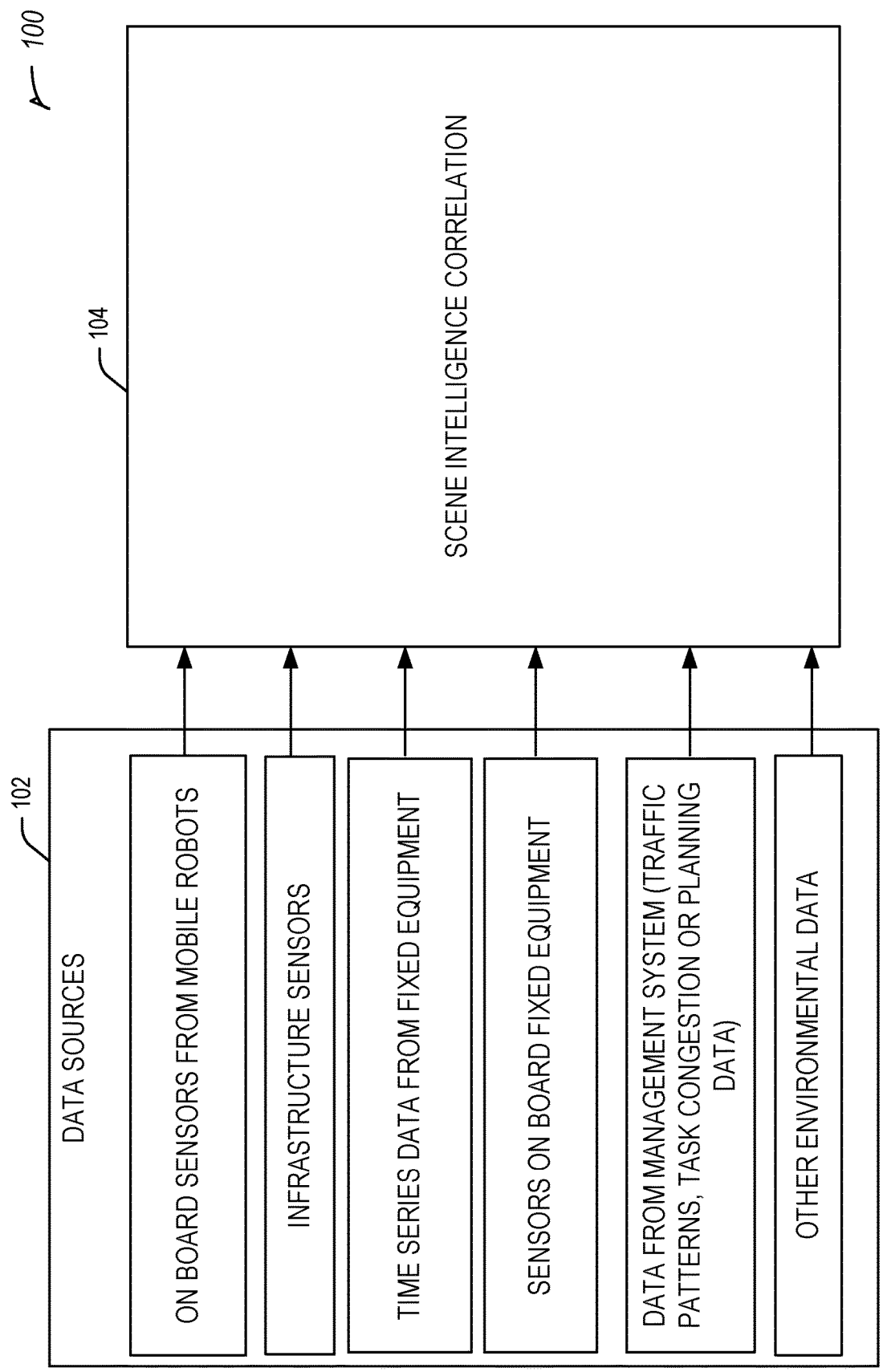
FIG. 1 illustrates a block diagram showing data sources for semantic mapping according to an example.

One particular type of robot is called an autonomous mobile robot (AMR). AMRs are typically used in industrial settings to perform various tasks, which may be simple or complex, solo or collaborative. AMRs are of diverse capabilities and are manufactured by different vendors, which makes it difficult to unify software stacks across AMRs and to have task assignment solutions interoperable with any AMR. In some examples, an AMR may include a vehicle. In some examples, an AMR may include equipment such as wheels, a drive train, a motor, etc. In some examples, the techniques discussed for an AMR may apply to autonomous vehicles generally, for example in certain environments.

Systems and techniques described herein provide semantic mapping for control and operation of an AMR. A semantic map is one that includes data (e.g., metadata) regarding a surrounding environment based on sensed information in the environment. The sensed information may include an image captured by a camera, audio captured by a microphone, or other sensor. The sensed information may be input to a trained classifier to obtain a class or type of information captured by the sensor. The class or type may be stored in an environmental map (e.g., a coordinate system, which may include locations of obstacles, goals, corridors, etc.) as metadata corresponding to a particular location where the information was captured by the sensor. In some examples, crowdsourcing from multiple AMRs or fixed sensors may be used to build the metadata for the semantic map.

The systems and techniques described herein provide a layer between AMRs of diverse capabilities and diverse vendors to help interoperability. This mediation layer is formed by automated semantic mapping, for example as metadata on an environmental map. The systems and techniques described herein automate semantic mapping to accelerate deployment and functioning of mobile robots. The automated semantic mapping may be leveraged in control and task assignment for diverse AMRs (e.g., of diverse capabilities such as available sensors or hardware components, from diverse vendors, having diverse software stacks, etc.). In some examples, an optimal or selected location may be identified for placement of a compute need in an edge continuum of AMRs using a semantic map. For example, latency sensitive decisions may be deployed closest to a control response location, while other less latency sensitive decisions may be moved further away from a control response location, in a dynamic fashion.

The systems and techniques described herein may use sematic mapping based on information captured by a sensor of an AMR (e.g., audio captured by a microphone, an image or video captured by a camera, ambient temperature captured by a thermometer, or the like). The sensor information may be used in re-localization of a lost robot, in some examples. An AMR may be come lost due to change in a landmark, cumulative errors in the robot motion controller, drift, or the like. Semantic mapping may help an AMR to understand where it is in the environment (e.g., factory floor), based on sensor information (e.g., audio or video) specific to the area. For example, a paint shop may have a particular sound, video signature, metadata, temperature, etc. The particular sensor information may correspond to known coordinates of a landmark or an area.

Systems and techniques may include creating a semantic environmental map automatically and collaboratively by using data collected by AMRs, such as multi-modal data or multi-modal scene intelligence. For example, multi-modal data may be used from already existing assets spread across a potential deployment environment such as a warehouse or a factory. These assets may include fixed sensors (e.g., a security or closed circuit camera), or mobile assets, such as on an AMR. Multi-modal scene intelligence may use a component of an AMR, such as a camera, a radar, a lidar, an audio sensor, etc., which may be used with scene information, for example shared in real-time with an edge node. Multi-modal data (e.g., audio, video, etc.) may be used to generate metadata about an environment. The metadata may be correlated within the environment to coordinates on an environment map. The metadata and the environment map may be used later for localization of the robot. This metadata may be used to warn a robot to not to trespass in a certain hazardous area, for example based on the pre-stored audio or video signatures (e.g., based on a class generated by a classifier).

In some examples, advanced federated learning may be used for environment characterization in real-time to build a semantic maps with a plurality of AMRs. The federated learning may include creation of adaptive routes for a changing environment. For example, a new roadblock or obstacle may be identified when perceived in a particular location of an environment. The federated learning may enhance safety or limit potential problems by learning changes in the environment in a collaborative fashion. For example, when a given AMR detects that a particular zone of the environment has oil, which may make the AMR slip, the AMR may share that information with the other AMRs via a semantic map (e.g., metadata on an environmental map).

The systems and techniques described herein allow for sensor augmentation among AMRs. For example, when one AMR has a specific sensor that another AMR does not have, the AMR with the specific sensor may augment a semantic map to be used by the other AMR. In this example, even as few as one single AMR with the particular sensor may be sufficient to provide the semantic coverage to all other AMRs.

In some examples, several AMRs or fixed sensors may collaborate to create a map of an unknown unmapped environment, where AMRs or fixed sensors may have diverse capabilities. This may result in an automated mapping for use with AMR deployment in an unmapped or changing environment. Semantic mapping may be used to help detect anomalies in an environment, such as when outlier data is detected from the map.

FIG. 1 illustrates a block diagram 100 showing data sources 102 for semantic mapping according to an example. The data sources 102 may be used to generate a scene intelligence correlation 104 for use as metadata of a semantic map in an environmental map. The data sources 102 may include onboard sensors from AMRs, infrastructure sensors, time series data from fixed equipment (e.g., from a temperature sensor, a seismograph, etc.), sensors on board fixed equipment, data from a management system (e.g., traffic patterns, task congestion, planning data, or the like), or other environmental data.

AMRs are equipped with onboard sensors such as a lidar, a vision camera, an inertial measurement sensor, etc. Several of these AMRs may be deployed in an environment such as a warehouse or a factory, and each AMR or set of AMRs may have a set of unique onboard sensors. The sensors of AMRs may differ in their features or capabilities, such as Field of View (FoV), resolution, etc. The environment may be equipped with one or more fixed assets that contribute to the sematic signature of environment. For example, an audio level in a particular manufacturing cell or vibrations generated from a particular machine operation may be unique and captured by a sensor. These fixed assets may be equipped with their own sensing equipment in some examples. The environment itself may have infrastructure sensors located throughout a facility.

As an AMR maneuvers in an environment, data from these sources in the environment or from onboard sensing may be ingested or correlated over temporal or spatial space. Data from one or more AMRs may be correlated along with an AMR pose, odometry, or timestamp of data generated. Data correlated over time from one or more AMRs may be used to create a normal view or an environment semantic map. An automated semantic environmental map is created and used to maneuver as the environment changes or to detect an anomaly in the environment.

Figure 2:
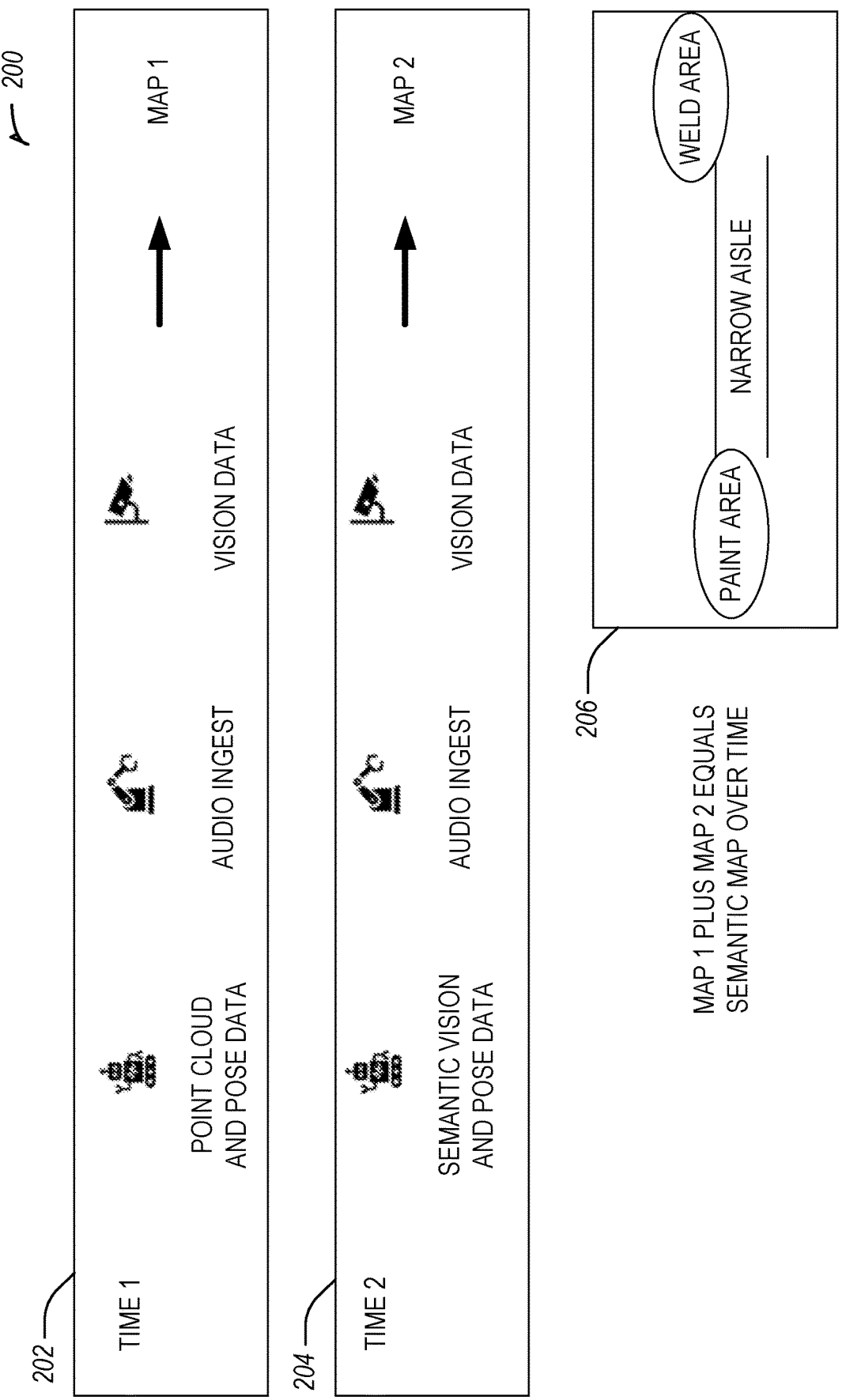
FIG. 2 illustrates a conceptual diagram showing a semantic mapping example according to an example.

FIG. 2 illustrates a conceptual diagram 200 showing a semantic mapping example according to an example. The conceptual diagram 200 includes a first timeline 202 and a second timeline 204. The first timeline illustrates an AMR using point cloud and pose data, ingesting audio, and capturing vision data to generate a first map. The second timeline illustrates an AMR using semantic vision and pose data, ingesting audio, and capturing vision data to generate a second map. The two maps may be used individually, or in combination (e.g., to create a shared map). Over time, each AMR may update its map or a combined map to generate a semantic map 206 over time. The semantic map 206 may include metadata corresponding to classes of information obtained by the AMRs, which is classified using a trained classifier. The metadata may be stored in the semantic map 206 as an overlay to a coordinate or environmental map. The semantic map 206 may include class identifiers, such as "paint area", "narrow aisle," "weld area," etc. These classes may be generated from audio or video source information obtained by an AMR. An AMR may operate in an industrial setting. The industrial setting may include multiple locations (e.g., a paint shop, a hallway, a welding area, etc.), such as in a car manufacturing facility. The AMR may navigate throughout the industrial setting in some examples.

An edge node (e.g., a server or computing device that is located in a particular area of an environment) may store a record including capabilities of an AMR (or all AMRs in a particular environment). The edge node may control decisions on tasks assignments among AMRs. For example, the edge node may identify low capability AMRs and high capability AMRs based on environment requirement (e.g., obstacle avoidance, path planning, collision avoidance).

In an example, an edge node interacts with a collaborative semantic mapping process by assigning tasks to high capability AMRs to contribute to the semantic mapping creation task. The edge node may send a request to a fixed asset in proximity of a low capability AMRs to create semantic mapping, in some examples, The edge node may aggregate semantic mapping from to help AMRs management. In some examples, the edge node may use the aggregated semantic map or assign tasks to AMRs based on their capabilities correlated with the type of environment indicated in the semantic map in a global aggregated view (e.g., in an area of several obstacles, AMR of low capabilities may not be assigned tasks).

An edge node may connect fixed infrastructure elements and AMRs, allowing for workload placement based on latency, capabilities, or processing requirements. Global optimization may allow for delayed decision making such as scheduling, path planning, etc. The global optimization may be managed as converged workloads on fixed edges. Local optimization may be used with low latency needs such as collision avoidance, safety related decisions, etc., which may be handled at the mobile edge or on an AMR. The edge node may seamlessly manage the workload movement between the fixed infrastructure elements and the AMRs via a unified orchestration scheme ensuring QoS requirements of the workloads are met. In some examples, QoS may be monitored by the workload providing information to the orchestration layer on whether performance targets are met or not.

Figure 3:
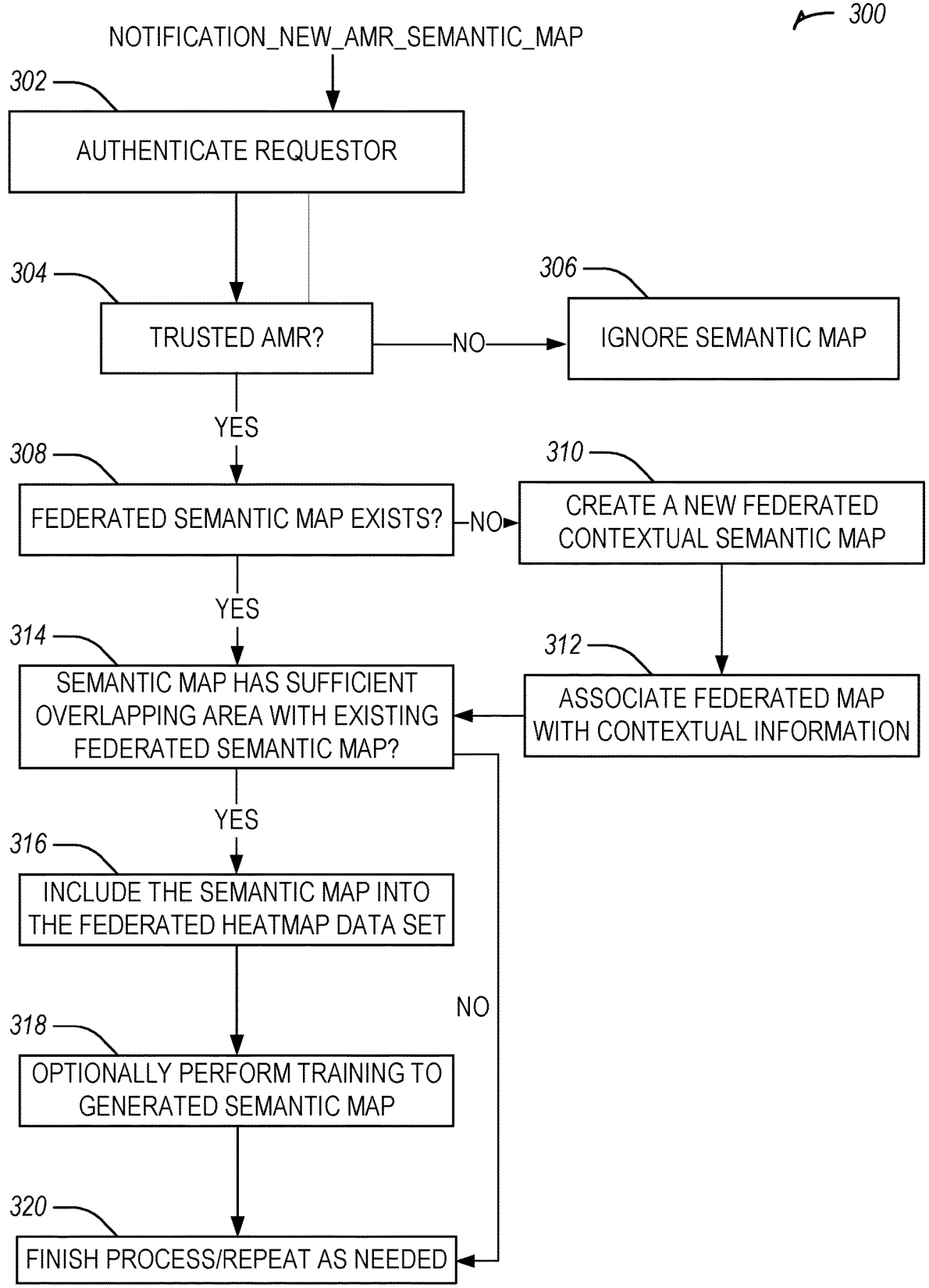
FIG. 3 illustrates a flowchart showing contextual semantic map federation according to an example.

FIG. 3 illustrates a flowchart 300 showing contextual semantic map federation according to an example. The flowchart 300 provides a technique for generating a federated semantic map, for example using a plurality of AMRs to obtain data that may be combined into the federated semantic map.

The flowchart 300 initiates with a notification of a new AMR semantic map. An AMR, edge node, or other device may access the new map. The flowchart 300 includes authenticating a requestor at operation 302. After the requestor is authenticated, the requestor determines at decision operation 304 whether an AMR that generated the new semantic map is to be trusted. When not trustworthy (which may include a security or authentication determination or an accuracy or likelihood of accuracy of information determination) the flowchart 300 ends at operation 306, with the requestor ignoring the semantic map. When the AMR is trustworthy, the flowchart moves to operation 308, which includes determining whether a federated semantic map exists. If not, the flowchart 300 includes creating a new federated contextual semantic map (e.g., using the new semantic map, data obtained by the requestor, stored environmental data, an environmental map, or the like). The new federated contextual semantic map may be associated with contextual information at operation 312. The flowchart 300 also uses an existing federated semantic map (if operation 308 determined one existed), or the new created map (from operation 312) to determine whether the semantic map has sufficient overlapping area with the existing or new federated semantic map at decision operation 314. When sufficient overlapping area is not available, the process finishes at operation 320, and more information is requested or the process is restarted when more information is available. When sufficient overlapping area is available, the flowchart 300 moves to operation 316 to include the semantic map into a federated heatmap data set corresponding to the federated contextual semantic map (new or created). The flowchart 300 includes optional operation 318 to perform training to the generated semantic map. The flowchart 300 ends with a new federated semantic map that incorporates the existing map identified in operation 308 or the map created in operation 312 along with the map that initiated flowchart 300. Federated training may be applied within different constellations of AMRs. For example, for each of a type of AMRs.

In some examples, temporality and spatiality may be used as part of the federated semantic map building in flowchart 300. Creation of semantic map may be for a particular area (e.g., a region of interest), for an environment, for a floor, etc. The semantic map may correspond to a time interval with different AMRs. The semantic mapping may be tracked as it evolves over time based on AMR data, for example using different types of AMRs that are collaborating with differing Point of View (POV) or technology (e.g., hardware or software capabilities). Over time, AMRs that are providing more data or more useful data may be identified to provide a more accurate description (e.g., the flowchart 300 may include a side operation to detect that a particular AMR has provided a view X from POV (a,b,c) and the subsequent AMRs crossing the same (a,b,c) with different technologies have provided a completely different view.

In some examples the federation may be performed over the cloud, for example for the case of different factories across different locations of geography. AMRs may work collaboratively to determine what variables are useful to create a selection of variables that define the semantic map in different ambient or contextual conditions. A technique may be used to identify how a semantic map created with a set of variables in a given context helps to reduce bad outcomes (e.g., accidents). In some examples, variables needed or used to create a semantic map during a period of time may be identified. For example, collectively sensor 1, sensor 2, and sensor 3 may be identified as the sensors that create better semantic maps in ambient conditions of 80% humidity and 28 degree Celsius temperature.

Semantic map trust may be used with the federated semantic map flowchart 300, or may be used separately. For example, a semantic map (federated or not) may be evaluated for trustworthiness. Trustworthiness may include security of a generating AMR or AMRs (e.g., whether the AMR may be authenticated, whether the AMR is likely to be malicious, etc.). Security may be limited to cases where AMRs share a common owner, operator, manufacturer, security software stack, etc. Trustworthiness may include accuracy of provided data, which may include accuracy or predicted likelihood of accuracy of data captured (e.g., based on hardware capabilities of the capturing AMR, such as camera resolution), accuracy of processing of the data (e.g., processing capabilities of the AMR, accuracy of the classifier used by the AMR, etc.), or accuracy of the semantic map metadata or environmental map. In an example, trust may be established by having multiple observers to the same Field of View (FOV) and identifying which one of them is providing different information. Loss of accuracy in some examples may be based on defective sensors or noise. Over time accuracy information may be used to identify whether a given AMR and particular sensor may be ignored or used (or weighted higher or lower) for a semantic map generation.

An edge node or an AMR may use a semantic map in its own logic in serval ways. For example, a semantic map may be used for automating the deployment of AMRs for automation and logistic planning scenarios in unmapped environments, such as warehouses, factories, or construction sites. Automated mapping may be used to create automation site plans, for example where to place pallets, picking stations, loading stations etc. A semantic map may be used to create a known good model of an environment such as for inspection applications. In this example, an AMR may leverage semantic map understanding to alert or mitigate failures in an environment such as factory automation, construction sites, etc.

A semantic map may be used to create an adaptive route for a changing environment. For example, new roadblocks may be identified that are changed in a particular location of a factory floor. Depending on the AMR type, conditional routes may be determined using the semantic map. In an example, a semantic map may be used to enhance safety or reduce potential problems by identifying changes in the environment. For example, when a particular AMR detects that a zone of the factory floor has oil that make the AMR slip, the particular AMR may share that information with other AMRs. A semantic map may be used to train a model, such as a neural network, to identify a likelihood of an accident is based on historical information.

In some examples, a semantic map may allow sensor augmentation between AMRs. In this case, when an AMR has a specific sensor that other AMRs do not have, the AMR with the capability may augment semantic maps of the AMRs without the capability. A semantic map may be used to relocate robots that become lost, as described herein. In an example, a semantic map may be used to avoiding a hazardous area based on audio or video signatures of the hazardous area.

Figure 4:
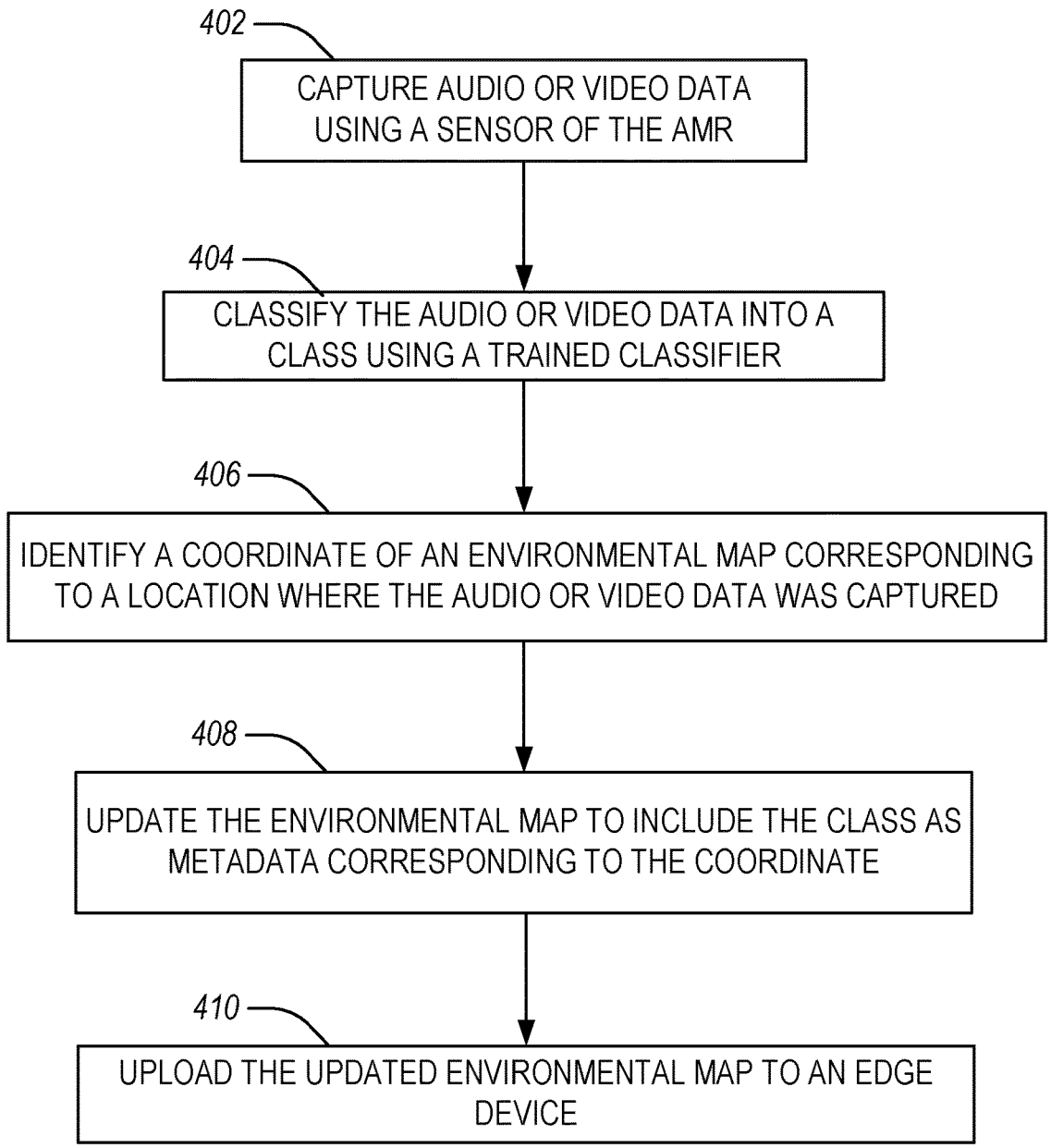
FIG. 4 illustrates a flowchart showing a technique for semantic mapping using an autonomous mobile robot (AMR) according to an example.

FIG. 4 illustrates a flowchart showing a technique 400 for semantic mapping using an autonomous mobile robot (AMR) according to an example. The technique 400 may be performed by a device or devices in an edge or datacenter network (e.g., an orchestrator, a base station, a server, a mobile device, an IoT device, or the like), by an AMR, etc.

The technique 400 includes an operation 402 to capture audio or video data using a sensor of the AMR. The sensor may include a microphone, a camera, a thermometer, an altimeter, or the like. The technique 400 includes an operation 404 to classify the audio or video data into a class using a trained classifier (e.g., perform a classification of the audio or video data). The trained classifier may be trained using the machine learning training techniques described herein.

The technique 400 includes an operation 406 to identify a coordinate of an environmental map corresponding to a location where the audio or video data was captured. The environmental map may include semantic metadata generated by a static sensor within the environment. In some examples, the environmental map may include semantic metadata generated by a fixed asset within the environment. For example, a fixed asset may generate audio or video that may be ingested by a sensor. In some examples, a fixed asset may generate time series data (e.g., voltage or pressure) that may be processed and ingested for collaborative semantic mapping.

In some examples, the environmental map includes semantic metadata generated by at least one other AMR. Use of the environmental map (e.g., by the AMR) may include determining trustworthiness of the at least one other AMR prior to the use. Trustworthiness may include determining whether the at least one other AMR is authenticated (e.g., secure), or determining whether data from the at least one other AMR is accurate (e.g., is likely to be accurate), such as quality of the data. Some examples rely on known AMRs with higher sensing capabilities to bring trusted information to the semantic map. An AMR may have a reputation (e.g., of trustworthiness). In some examples, a weight given to metadata coming from an AMR for use in a semantic map may be based on the reputation of the AMR.

The technique 400 includes an operation 408 to update the environmental map to include the class as metadata corresponding to the coordinate. Prior to operation 408, the technique 400 may include retrieving the environmental map from the edge device. The environmental map may include at least one class generated by a second AMR. In some examples, the second AMR may be made, operated, or owned by a different manufacturer or owner than the AMR. Operation 408 may include identifying a change to the coordinate based on the location.

The technique 400 includes an operation 410 to upload the updated environmental map to an edge device. The technique 400 may include accessing the environmental map from the edge device, the environmental map generated using federated learning across a plurality of decentralized edge devices including the edge device. The federated learning may be based on data from a plurality of AMRs.

The technique 400 may include an operation to determine that an orientation or location of the AMR cannot be resolved. In response to this operation, the technique 400 may include operations to capture additional audio or video data, classify the additional audio or video data into a second class using the trained classifier, determine that the second class matches the class, or resolve the orientation or the location of the AMR using the updated environmental map.

In further examples, any of the compute nodes or devices discussed with reference to the present edge computing systems and environment may be fulfilled based on the components depicted in FIGS. 5A and 5B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 5A:
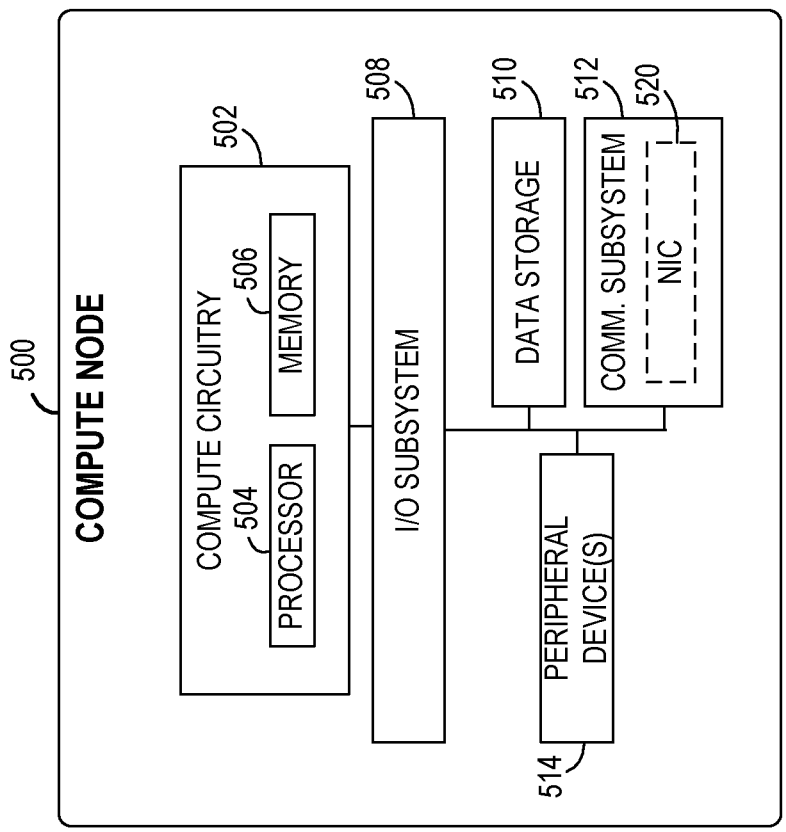
FIG. 5A provides an overview of example components for compute deployed at a compute node.

In the simplified example depicted in FIG. 5A, an edge compute node 500 includes a compute engine (also referred to herein as "compute circuitry") 502, an input/output (I/O) subsystem 508, data storage 510, a communication circuitry subsystem 512, and, optionally, one or more peripheral devices 514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 500 may be embodied as any type of engine, device, or collection of devices capable of performing various compute functions. In some examples, the compute node 500 may be embodied as a single device such as an integrated circuit, an embedded system, a field-programmable gate array (FPGA), a system-on-a-chip (SOC), or other integrated system or device. In the illustrative example, the compute node 500 includes or is embodied as a processor 504 and a memory 506. The processor 504 may be embodied as any type of processor capable of performing the functions described herein (e.g., executing an application). For example, the processor 504 may be embodied as a multi-core processor(s), a microcontroller, a processing unit, a specialized or special purpose processing unit, or other processor or processing/controlling circuit.

In some examples, the processor 504 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 504 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 504 may work in coordination with each other to execute many types of operations and instructions within and on behalf of the compute node 500.

The memory 506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 506 may be integrated into the processor 504. The memory 506 may store various software and data used during operation such as one or more applications, data operated on by the application(s), libraries, and drivers.

The compute circuitry 502 is communicatively coupled to other components of the compute node 500 via the I/O subsystem 508, which may be embodied as circuitry and/or components to facilitate input/output operations with the compute circuitry 502 (e.g., with the processor 504 or the main memory 506) and other components of the compute circuitry 502. For example, the I/O subsystem 508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 508 may form a portion of a system-on-a-chip (SoC) and be incorporated, along with one or more of the processor 504, the memory 506, and other components of the compute circuitry 502, into the compute circuitry 502.

The one or more illustrative data storage devices 510 may be embodied as any type of devices configured for short-term or long-term storage of data such as, for example, memory devices and circuits, memory cards, hard disk drives, solid-state drives, or other data storage devices. Individual data storage devices 510 may include a system partition that stores data and firmware code for the data storage device 510. Individual data storage devices 510 may also include one or more operating system partitions that store data files and executables for operating systems depending on, for example, the type of compute node 500.

The communication circuitry 512 may be embodied as any communication circuit, device, or collection thereof, capable of enabling communications over a network between the compute circuitry 502 and another compute device (e.g., a gateway of an implementing computing system). The communication circuitry 512 may be configured to use any one or more communication technology (e.g., wired or wireless communications) and associated protocols (e.g., a cellular networking protocol such as a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 512 includes a network interface controller (NIC) 520, which may also be referred to as a host fabric interface (HFI). The NIC 520 may be embodied as one or more add-in-boards, daughter cards, network interface cards, controller chips, chipsets, or other devices that may be used by the compute node 500 to connect with another compute device (e.g., a gateway node). In some examples, the NIC 520 may be embodied as part of a system-on-a-chip (SoC) that includes one or more processors, or included on a multichip package that also contains one or more processors. In some examples, the NIC 520 may include a local processor (not shown) and/or a local memory (not shown) that are both local to the NIC 520. In such examples, the local processor of the NIC 520 may be capable of performing one or more of the functions of the compute circuitry 502 described herein. Additionally, or alternatively, in such examples, the local memory of the NIC 520 may be integrated into one or more components of the client compute node at the board level, socket level, chip level, or other levels.

Additionally, in some examples, a respective compute node 500 may include one or more peripheral devices 514. Such peripheral devices 514 may include any type of peripheral device found in a compute device or server such as audio input devices, a display, other input/output devices, interface devices, and/or other peripheral devices, depending on the particular type of the compute node 500. In further examples, the compute node 500 may be embodied by a respective compute node (whether a client, gateway, or aggregation node) in a computing system or like forms of appliances, computers, subsystems, circuitry, or other components.

Figure 5B:
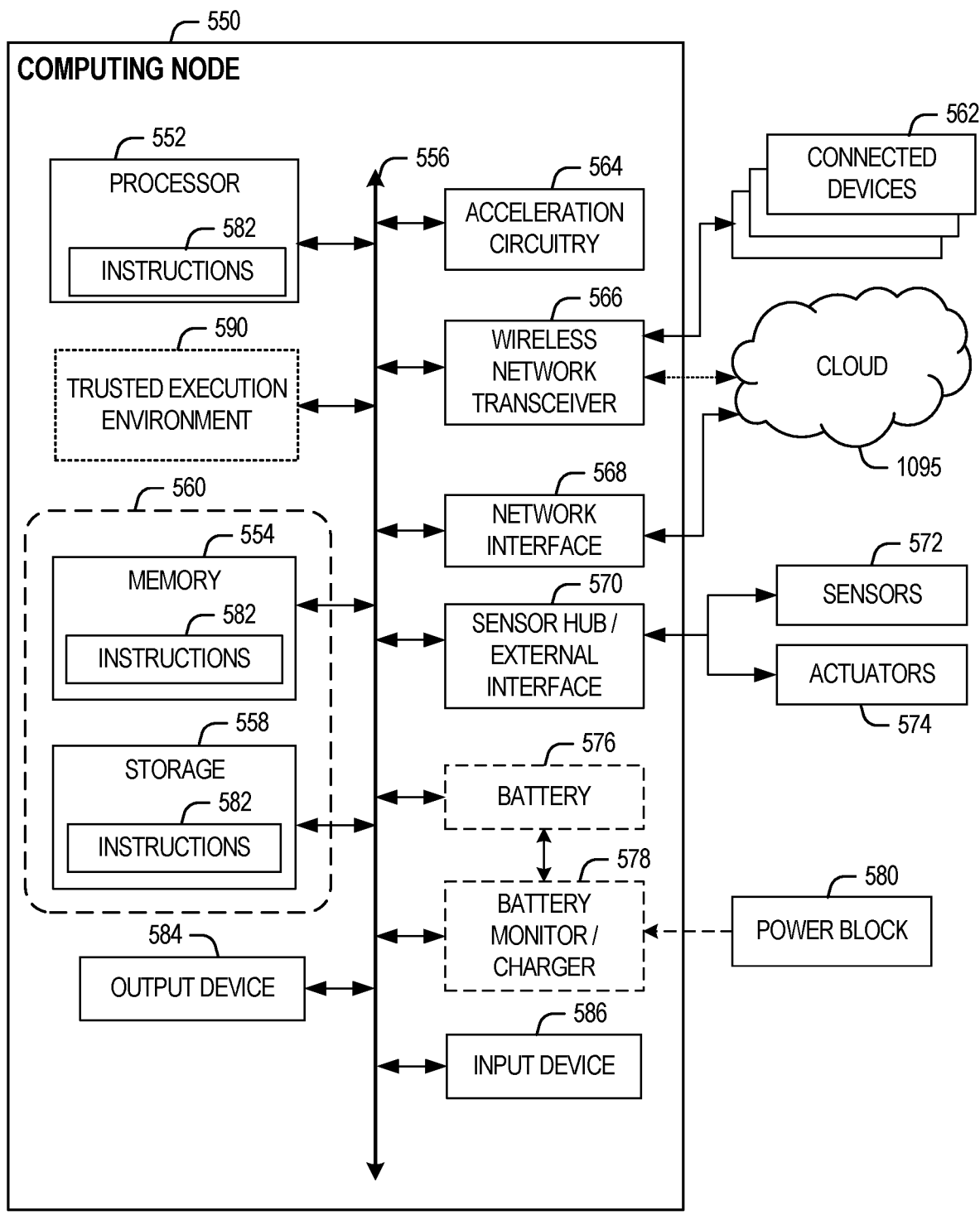
FIG. 5B provides a further overview of example components within a computing device.

In a more detailed example, FIG. 5B illustrates a block diagram of an example of components that may be present in a computing node 550 for implementing the techniques (e.g., operations, processes, methods, and methodologies) described herein. This computing node 550 provides a closer view of the respective components of node 500 when implemented as or as part of a computing device (e.g., as a mobile device, a base station, server, gateway, etc.). The computing node 550 may include any combinations of the hardware or logical components referenced herein, and it may include or couple with any device usable with an communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 550, or as components otherwise incorporated within a chassis of a larger system.

The computing device 550 may include processing circuitry in the form of a processor 552, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 552 may be a part of a system on a chip (SoC) in which the processor 552 and other components are formed into a single integrated circuit, or a single package, such as the Edison™ or Galileo™ SoC boards from Intel Corporation, Santa Clara, California. As an example, the processor 552 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 552 and accompanying circuitry may be provided in a single socket form factor, multiple socket form factor, or a variety of other formats, including in limited hardware configurations or configurations that include fewer than all elements shown in FIG. 5B.

The processor 552 may communicate with a system memory 554 over an interconnect 556 (e.g., a bus). Any number of memory devices may be used to provide for a given amount of system memory. As examples, the memory 554 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 558 may also couple to the processor 552 via the interconnect 556. In an example, the storage 558 may be implemented via a solid-state disk drive (SSDD). Other devices that may be used for the storage 558 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 558 may be on-die memory or registers associated with the processor 552. However, in some examples, the storage 558 may be implemented using a micro hard disk drive (HDD). Further, any number of new technologies may be used for the storage 558 in addition to, or instead of, the technologies described, such resistance change memories, phase change memories, holographic memories, or chemical memories, among others.

The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 556 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 556 may couple the processor 552 to a transceiver 566, for communications with the connected devices 562. The transceiver 566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 566 (or multiple transceivers) may communicate using multiple standards or radios for communications at a different range. For example, the computing node 550 may communicate with close devices, e.g., within about 10 meters, using a local transceiver based on Bluetooth Low Energy (BLE), or another low power radio, to save power. More distant connected devices 562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 566 (e.g., a radio transceiver) may be included to communicate with devices or services in the cloud 595 via local or wide area network protocols. The wireless network transceiver 566 may be a low-power wide-area (LPWA) transceiver that follows the IEEE 802.15.4, or IEEE 802.15.4g standards, among others. The computing node 550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 566, as described herein. For example, the transceiver 566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 568 may be included to provide a wired communication to nodes of the cloud 595 or to other devices, such as the connected devices 562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 568 may be included to enable connecting to a second network, for example, a first NIC 568 providing communications to the cloud over Ethernet, and a second NIC 568 providing communications to other devices over another type of network.

Given the variety of types of applicable communications from the device to another component or network, applicable communications circuitry used by the device may include or be embodied by any one or more of components 564, 566, 568, or 570. Accordingly, in various examples, applicable means for communicating (e.g., receiving, transmitting, etc.) may be embodied by such communications circuitry.

The computing node 550 may include or be coupled to acceleration circuitry 564, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 556 may couple the processor 552 to a sensor hub or external interface 570 that is used to connect additional devices or subsystems. The devices may include sensors 572, such as accelerometers, level sensors, flow sensors, optical light sensors, camera sensors, temperature sensors, global navigation system (e.g., GPS) sensors, pressure sensors, barometric pressure sensors, and the like. The hub or interface 570 further may be used to connect the computing node 550 to actuators 574, such as power switches, valve actuators, an audible sound generator, a visual warning device, and the like.

In some optional examples, various input/output (I/O) devices may be present within or connected to, the computing node 550. For example, a display or other output device 584 may be included to show information, such as sensor readings or actuator position. An input device 586, such as a touch screen or keypad may be included to accept input. An output device 584 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 550. A display or console hardware, in the context of the present system, may be used to provide output and receive input of an computing system; to manage components or services of a computing system; identify a state of a computing component or service; or to conduct any other number of management or administration functions or service use cases.

A battery 576 may power the computing node 550, although, in examples in which the computing node 550 is mounted in a fixed location, it may have a power supply coupled to an electrical grid, or the battery may be used as a backup or for temporary capabilities. The battery 576 may be a lithium ion battery, or a metal-air battery, such as a zinc-air battery, an aluminum-air battery, a lithium-air battery, and the like.

A battery monitor/charger 578 may be included in the computing node 550 to track the state of charge (SoCh) of the battery 576, if included. The battery monitor/charger 578 may be used to monitor other parameters of the battery 576 to provide failure predictions, such as the state of health (SoH) and the state of function (SoF) of the battery 576. The battery monitor/charger 578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 578 may communicate the information on the battery 576 to the processor 552 over the interconnect 556. The battery monitor/charger 578 may also include an analog-to-digital (ADC) converter that enables the processor 552 to directly monitor the voltage of the battery 576 or the current flow from the battery 576. The battery parameters may be used to determine actions that the computing node 550 may perform, such as transmission frequency, mesh network operation, sensing frequency, and the like.

A power block 580, or other power supply coupled to a grid, may be coupled with the battery monitor/charger 578 to charge the battery 576. In some examples, the power block 580 may be replaced with a wireless power receiver to obtain the power wirelessly, for example, through a loop antenna in the computing node 550. A wireless battery charging circuit, such as an LTC4020 chip from Linear Technologies of Milpitas, California, among others, may be included in the battery monitor/charger 578. The specific charging circuits may be selected based on the size of the battery 576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 558 may include instructions 582 in the form of software, firmware, or hardware commands to implement the techniques described herein. Although such instructions 582 are shown as code blocks included in the memory 554 and the storage 558, it may be understood that any of the code blocks may be replaced with hardwired circuits, for example, built into an application specific integrated circuit (ASIC).

In an example, the instructions 582 provided via the memory 554, the storage 558, or the processor 552 may be embodied as a non-transitory, machine-readable medium 560 including code to direct the processor 552 to perform electronic operations in the computing node 550. The processor 552 may access the non-transitory, machine-readable medium 560 over the interconnect 556. For instance, the non-transitory, machine-readable medium 560 may be embodied by devices described for the storage 558 or may include specific storage units such as optical disks, flash drives, or any number of other hardware devices. The non-transitory, machine-readable medium 560 may include instructions to direct the processor 552 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 582 on the processor 552 (separately, or in combination with the instructions 582 of the machine readable medium 560) may configure execution or operation of a trusted execution environment (TEE) 590. In an example, the TEE 590 operates as a protected area accessible to the processor 552 for secure execution of instructions and secure access to data. Various implementations of the TEE 590, and an accompanying secure area in the processor 552 or the memory 554 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 550 through the TEE 590 and the processor 552.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 6:
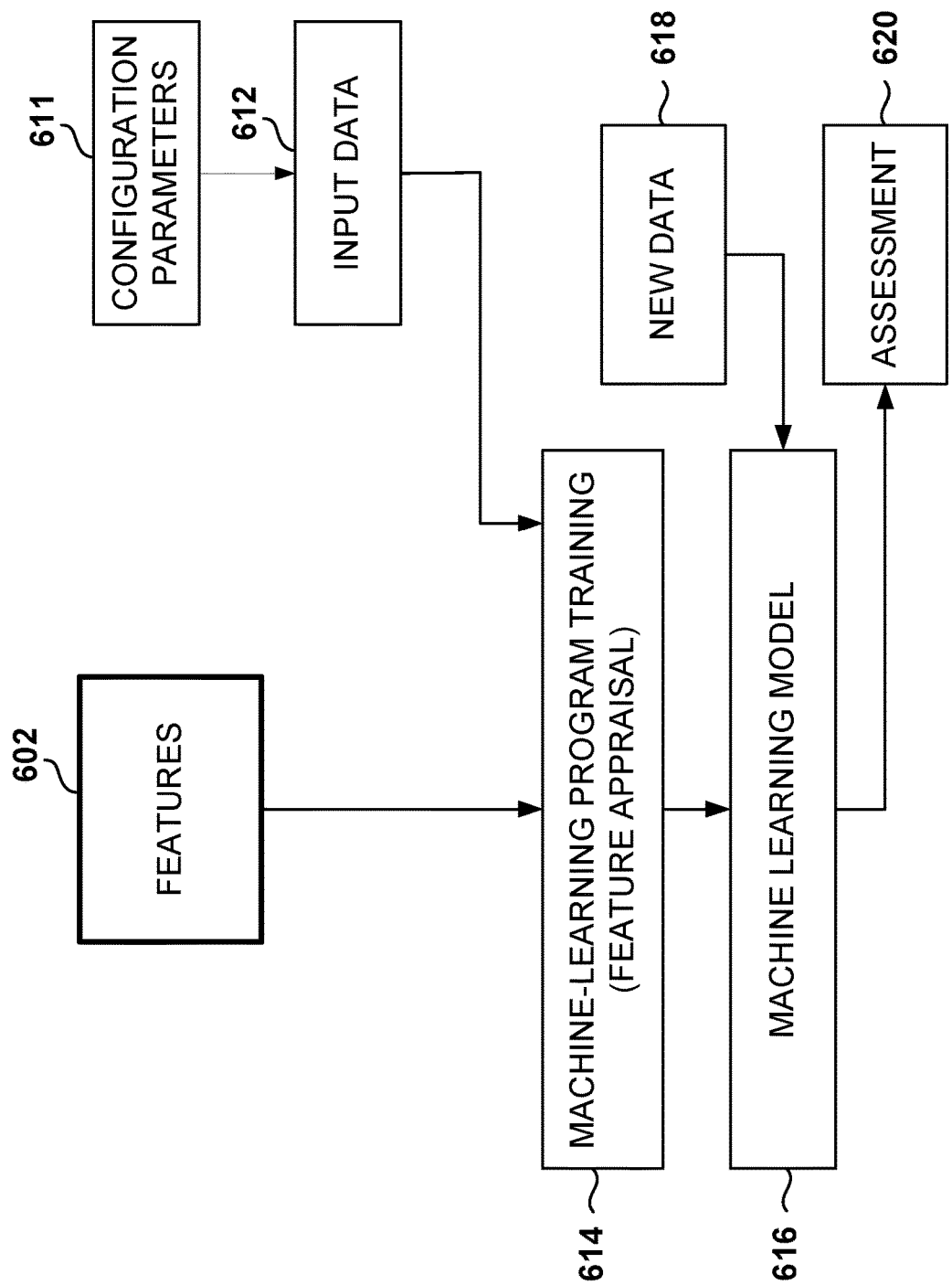
FIG. 6 illustrates training and use of a machine-learning program in accordance with some example examples.

FIG. 6 illustrates the training and use of a machine-learning program, according to some example embodiments. In some example embodiments, machine-learning programs (MLPs), also referred to as machine-learning algorithms or tools, are utilized to coordinate robots to perform a complex task.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Although example embodiments are presented with respect to a few machine-learning tools, the principles presented herein may be applied to other machine-learning tools.

Unsupervised ML is the training of an ML algorithm using information that is neither classified nor labeled, and allowing the algorithm to act on that information without guidance. Unsupervised ML is useful in exploratory analysis because it can automatically identify structure in data.

Some common tasks for unsupervised ML include clustering, representation learning, and density estimation. Some examples of commonly used unsupervised-ML algorithms are K-means clustering, principal component analysis, and autoencoders. In some embodiments, example ML model 616 outputs actions for one or more robots to achieve a task, to identify an unsafe robot action or unsafe robot, detect a safety event, generate a safety factor, or the like.

The machine-learning algorithms use data 612 (e.g., action primitives or interaction primitives, goal vector, reward, etc.) to find correlations among identified features 602 that affect the outcome. A feature 602 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

During training 614, the ML algorithm analyzes the input data 612 based on identified features 602 and configuration parameters 611 defined for the training (e.g., environmental data, state data, robot sensor data, etc.). The result of the training 614 is an ML model 616 that is capable of taking inputs to produce an output.

Training an ML algorithm involves analyzing data to find correlations. The ML algorithms utilize the input data 612 to find correlations among the identified features 602 that affect the outcome or assessment 620. In some examples, the training data 612 includes labeled data, which is known data for one or more identified features 602 and one or more outcomes, such as accuracy of the input data.

The ML algorithms usually explore many possible functions and parameters before finding what the ML algorithms identify to be the best correlations within the data; therefore, training may make use of large amounts of computing resources and time, such as many iterations for a Reinforcement Learning technique.

Many ML algorithms include configuration parameters 611, and the more complex the ML algorithm, the more parameters there are that are available to the user. The configuration parameters 611 define variables for an ML algorithm in the search for the best ML model.

When the ML model 616 is used to perform an assessment, new data 618 is provided as an input to the ML model 616, and the ML model 616 generates the assessment 620 as output.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is a method or instruction set for operating an autonomous mobile robot (AMR), such as provided by at least one machine readable medium including instructions, which when executed by processing circuitry of the AMR, cause the AMR to: capture audio or video data using a sensor of the AMR; perform a classification of the audio or video data using a trained classifier; identify a coordinate of an environmental map corresponding to a location where the audio or video data was captured; update the environmental map to include the classification as metadata corresponding to the coordinate; and communicate the updated environmental map to an edge device.

In Example 2, the subject matter of Example 1 includes, wherein the method or instructions further cause the AMR to retrieve the environmental map from the edge device prior to updating the environmental map, the environmental map including at least one classification generated by a second AMR.

In Example 3, the subject matter of Example 2 includes, wherein the second AMR was made by a different manufacturer than the AMR.

In Example 4, the subject matter of Examples 1-3 includes, wherein the method or instructions further cause the AMR to: determine, at the AMR, that an orientation or location of the AMR cannot be resolved; and in response: capture additional audio or video data; perform a second classification of the additional audio or video data using the trained classifier; determine that the second classification matches the classification; and resolve the orientation or the location of the AMR using the updated environmental map.

In Example 5, the subject matter of Examples 1-4 includes, wherein the method or instructions further cause the AMR to access the environmental map from the edge device, the environmental map generated using federated learning across a plurality of decentralized edge devices including the edge device, wherein the federated learning is based on data from a plurality of AMRs.

In Example 6, the subject matter of Examples 1-5 includes, wherein the environmental map includes semantic metadata generated by at least one other AMR, and wherein the instructions further cause the AMR to, prior to the use of the environmental map, determine trustworthiness of the at least one other AMR.

In Example 7, the subject matter of Example 6 includes, wherein to determine the trustworthiness of the at least one other AMR, the instructions further cause the AMR to (i) determine whether the at least one other AMR is authenticated or (ii) determine whether data from the at least one other AMR is accurate.

In Example 8, the subject matter of Examples 1-7 includes, wherein to update the environmental map, the method or instructions further cause the AMR to identify a change to the coordinate based on the location.

In Example 9, the subject matter of Examples 1-8 includes, wherein the environmental map includes semantic metadata generated by a static sensor within the environment.

In Example 10, the subject matter of Examples 1-9 includes, wherein the sensor of the AMR includes at least one of a microphone or a camera.

Example 11 is an autonomous mobile robot (AMR) comprising: a sensor to capture audio or video data; processing circuitry; memory, including instructions, which when executed by the processing circuitry, cause the processing circuitry to: perform a classification of the audio or video data using a trained classifier; identify a coordinate of an environmental map corresponding to a location where the audio or video data was captured; and update the environmental map to include the classification as metadata corresponding to the coordinate; and communication circuitry to communicate the updated environmental map to an edge device.

In Example 12, the subject matter of Example 11 includes, wherein the communication circuitry is further to retrieve the environmental map from the edge device prior to updating the environmental map, the environmental map including at least one classification generated by a second AMR.

In Example 13, the subject matter of Example 12 includes, wherein the second AMR was made by a different manufacturer than the AMR.

In Example 14, the subject matter of Examples 11-13 includes, wherein the instructions further cause the processing circuitry to: determine, at the AMR, that an orientation or location of the AMR cannot be resolved; and in response: capture additional audio or video data; perform a second classification of the additional audio or video data using the trained classifier; determine that the second classification matches the classification; and resolve the orientation or the location of the AMR using the updated environmental map.

In Example 15, the subject matter of Examples 11-14 includes, wherein the instructions further cause the AMR to access the environmental map from the edge device, the environmental map generated using federated learning across a plurality of decentralized edge devices including the edge device, wherein the federated learning is based on data from a plurality of AMRs.

In Example 16, the subject matter of Examples 11-15 includes, wherein the environmental map includes semantic metadata generated by at least one other AMR, and wherein the instructions further cause the AMR to, prior to the use of the environmental map, determine trustworthiness of the at least one other AMR.

In Example 17, the subject matter of Example 16 includes, wherein to determine the trustworthiness of the at least one other AMR, the instructions further cause the processing circuitry to (i) determine whether the at least one other AMR is authenticated or (ii) determine whether data from the at least one other AMR is accurate.

In Example 18, the subject matter of Examples 11-17 includes, wherein to update the environmental map, the instructions further cause the processing circuitry to identify a change to the coordinate based on the location.

In Example 19, the subject matter of Examples 11-18 includes, wherein the environmental map includes semantic metadata generated by a static sensor within the environment.

In Example 20, the subject matter of Examples 11-19 includes, wherein the sensor includes at least one of a microphone or a camera.

Example 21 is an apparatus comprising: means for capturing audio or video data; means for classifying the audio or video data into a classification; means for identifying a coordinate of an environmental map corresponding to a location where the audio or video data was captured; means for updating the environmental map to include the classification as metadata corresponding to the coordinate; and means for uploading the updated environmental map to an edge device.

In Example 22, the subject matter of Example 21 includes, means for retrieving the environmental map from the edge device prior to updating the environmental map, the environmental map including at least one class generated by a second apparatus.

In Example 23, the subject matter of Example 22 includes, wherein the apparatus is an autonomous mobile robot (AMR) and wherein the second apparatus is an AMR that was made by a different manufacturer than the apparatus.

In Example 24, the subject matter of Examples 21-23 includes, wherein the environmental map includes semantic metadata generated by a static sensor within the environment.

In Example 25, the subject matter of Examples 21-24 includes, means for accessing the environmental map from the edge device, the environmental map generated using federated learning across a plurality of decentralized edge devices including the edge device, wherein the federated learning is based on data from a plurality of apparatuses.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Another example implementation is an edge computing system, including respective edge processing devices and nodes to invoke or perform the operations of Examples 1-25, or other subject matter described herein.

Another example implementation is a client endpoint node, operable to invoke or perform the operations of Examples 1-25, or other subject matter described herein.

Another example implementation is an aggregation node, network hub node, gateway node, or core data processing node, within or coupled to an edge computing system, operable to invoke or perform the operations of Examples 1-25, or other subject matter described herein.

Another example implementation is an access point, base station, road-side unit, street-side unit, or on-premise unit, within or coupled to an edge computing system, operable to invoke or perform the operations of Examples 1-25, or other subject matter described herein.

Another example implementation is an edge provisioning node, service orchestration node, application orchestration node, or multi-tenant management node, within or coupled to an edge computing system, operable to invoke or perform the operations of Examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-25, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 1-25, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-25, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-25, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-25, or other subject matter described herein.

Another example implementation is an edge node configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-25, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-25 or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-25, or other subject matter described herein.

Another example implementation is an apparatus of an edge computing system comprising means, logic, modules, or circuitry to invoke or perform the use cases discussed herein, with use of Examples 1-25, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. At least one non-transitory machine readable medium, including instructions for operating an autonomous mobile robot (AMR), which when executed by processing circuitry of the AMR, cause the AMR to:
   receive an environmental map at the AMR;
   cause the AMR to navigate through an environment corresponding to the environmental map;
   capture, at a location during navigation of the AMR through the environment, audio or video data using a sensor of the AMR;
   perform a classification of the audio or video data using a trained classifier;
   identify a coordinate of the environmental map corresponding to the location in the environment where the audio or video data was captured by the sensor during navigation of the AMR;
   update the environmental map to include the classification as metadata corresponding to the coordinate;
   communicate the updated environmental map to an edge device; and
   cause the AMR to access the environmental map from the edge device, the environmental map generated using federated learning, the federated learning based on data from a plurality of AMRs.

2. The at least one machine readable medium of claim 1, wherein the instructions further cause the AMR to retrieve the environmental map from the edge device prior to updating the environmental map, the environmental map including at least one classification generated by a second AMR.

3. The at least one machine readable medium of claim 1, wherein the instructions further cause the AMR to:
determine, at the AMR, that an orientation or location of the AMR cannot be resolved; and
in response:
capture additional audio or video data;
perform a second classification of the additional audio or video data using the trained classifier;
determine that the second classification matches the classification; and
resolve the orientation or the location of the AMR using the updated environmental map.

4. The at least one machine readable medium of claim 1, wherein the environmental map is generated using federated learning across a plurality of decentralized edge devices including the edge device.

5. The at least one machine readable medium of claim 1, wherein the environmental map includes semantic metadata generated by at least one other AMR, and wherein the instructions further cause the AMR to, prior to the use of the environmental map, determine trustworthiness of the at least one other AMR.

6. The at least one machine readable medium of claim 5, wherein to determine the trustworthiness of the at least one other AMR, the instructions further cause the AMR to (i) determine whether the at least one other AMR is authenticated or (ii) determine whether data from the at least one other AMR is accurate.

7. The at least one machine readable medium of claim 1, wherein to update the environmental map, the instructions further cause the AMR to identify a change to the coordinate based on the location.

8. The at least one machine readable medium of claim 1, wherein the environmental map includes semantic metadata generated by a static sensor within the environment.

9. The at least one machine readable medium of claim 1, wherein the sensor of the AMR includes at least one of a microphone or a camera.

10. An autonomous mobile robot (AMR) comprising:
a sensor to capture, at a location during navigation of the AMR through an environment corresponding to an environmental map, audio or video data;
processing circuitry;
memory, including instructions, which when executed by the processing circuitry, cause the processing circuitry to:
receive the environmental map at the AMR;
cause the AMR to navigate through the environment;
perform a classification of the audio or video data using a trained classifier;
identify a coordinate of the environmental map corresponding to the location in the environment where the audio or video data was captured by the sensor during navigation of the AMR;
update the environmental map to include the classification as metadata corresponding to the coordinate;
communication circuitry to communicate the updated environmental map to an edge device; and
cause the AMR to access the environmental map from the edge device, the environmental map generated using federated learning, the federated learning based on data from a plurality of AMRs.

11. The AMR of claim 10, wherein the communication circuitry is further to retrieve the environmental map from the edge device prior to updating the environmental map, the environmental map including at least one classification generated by a second AMR.

12. The AMR of claim 11, wherein the second AMR was made by a different manufacturer than the AMR.

13. The AMR of claim 10, wherein the instructions further cause the processing circuitry to:
determine, at the AMR, that an orientation or location of the AMR cannot be resolved; and
in response:
capture additional audio or video data;
perform a second classification of the additional audio or video data using the trained classifier;
determine that the second classification matches the classification; and
resolve the orientation or the location of the AMR using the updated environmental map.

14. The AMR of claim 10, wherein the environmental map is generated using federated learning across a plurality of decentralized edge devices including the edge device.

15. The AMR of claim 10, wherein the environmental map includes semantic metadata generated by at least one other AMR, and wherein the instructions further cause the AMR to, prior to the use of the environmental map, determine trustworthiness of the at least one other AMR.

16. The AMR of claim 15, wherein to determine the trustworthiness of the at least one other AMR, the instructions further cause the processing circuitry to (i) determine whether the at least one other AMR is authenticated or (ii) determine whether data from the at least one other AMR is accurate.

17. The AMR of claim 11, wherein to update the environmental map, the instructions further cause the processing circuitry to identify a change to the coordinate based on the location.

18. The AMR of claim 10, wherein the environmental map includes semantic metadata generated by a static sensor within the environment.

19. The AMR of claim 10, wherein the sensor includes at least one of a microphone or a camera.

20. An apparatus comprising:
means for receiving an environmental map at an autonomous mobile robot (AMR);
means for causing the AMR to navigate through an environment corresponding to the environmental map;
means for capturing, at a location during navigation of the AMR through the environment, audio or video data;
means for classifying the audio or video data into a classification;
means for identifying a coordinate of the environmental map corresponding to the location in the environment where the audio or video data was captured during navigation of the AMR;
means for updating the environmental map to include the classification as metadata corresponding to the coordinate;
means for uploading the updated environmental map to an edge device; and
cause the AMR to access the environmental map from the edge device, the environmental map generated using federated learning, the federated learning based on data from a plurality of AMRs.

21. The apparatus of claim 20, further comprising means for retrieving the environmental map from the edge device prior to updating the environmental map, the environmental map including at least one class generated by a second apparatus.

22. The apparatus of claim 21, wherein the apparatus is an autonomous mobile robot (AMR) and wherein the second apparatus is an AMR that was made by a different manufacturer than the apparatus.

23. The apparatus of claim 20, wherein the environmental map includes semantic metadata generated by a static sensor within the environment.

24. The apparatus of claim 20, wherein the environmental map is generated using federated learning across a plurality of decentralized edge devices including the edge device.

* * * * *